United States Patent Office 3,382,425
Patented May 7, 1968

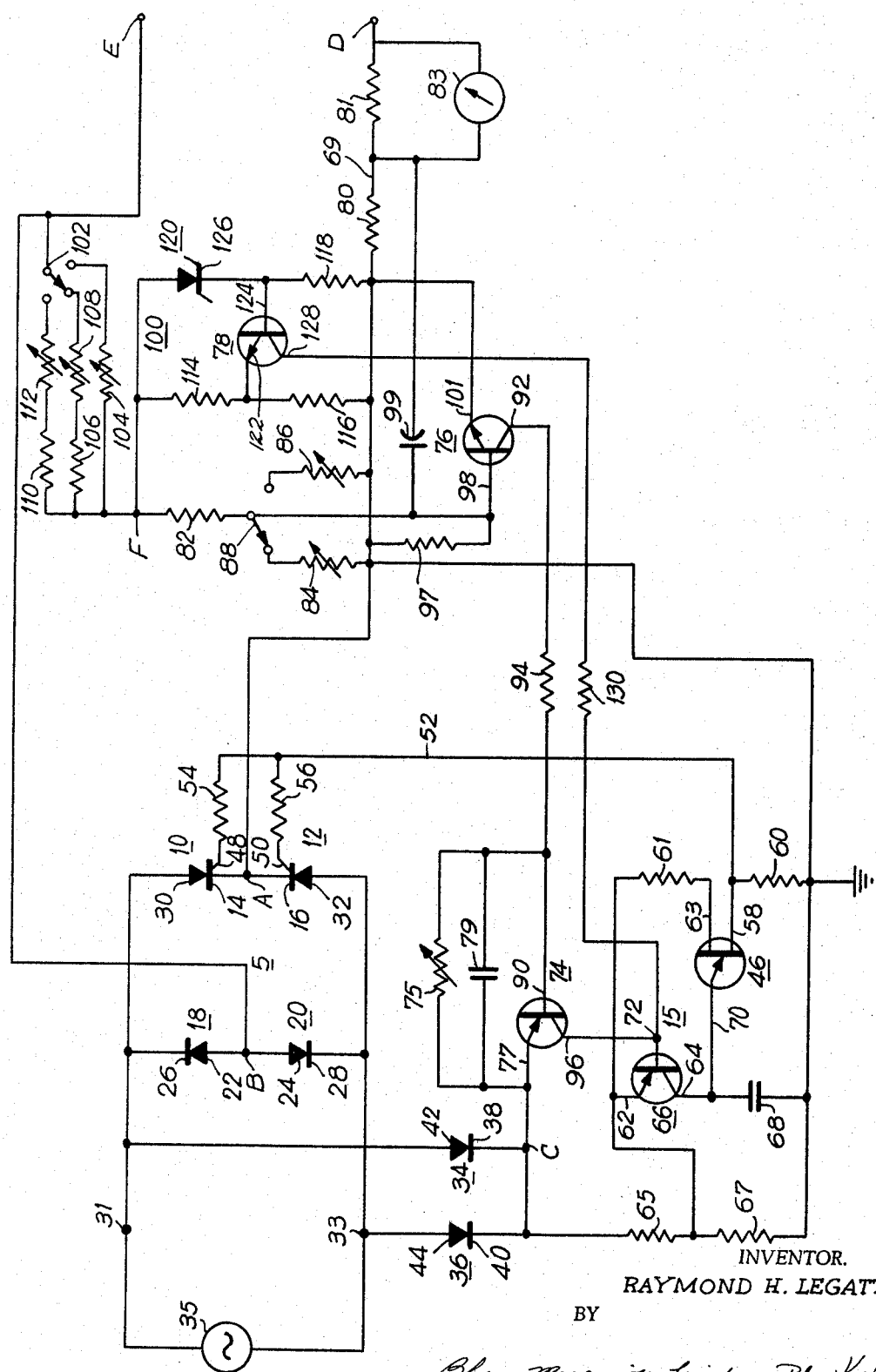

3,382,425
BATTERY CHARGER
Raymond H. Legatti, Moultrie, Ga., assignor to Electromagnetic Industries, Inc., Sayville, N.Y., a corporation of New York
Filed Oct. 5, 1965, Ser. No. 493,109
7 Claims. (Cl. 320—32)

ABSTRACT OF THE DISCLOSURE

An apparatus for charging batteries having gate-controlled rectifier means and automatic charging current and charging voltage control which is independent of A.C. source voltage magnitude and frequency variation.

This invention relates to a battery charger system and more particularly to a compact lightweight and efficient battery charger circuit providing automatic charging current and charging voltage control which is independent of A.C. source voltage magnitude and frequency variation, while protecting against over voltage or short circuit conditions.

When charging a battery, in order to minimize gassing and to avoid overheating of the battery it is necessary to charge the battery at a preselected rate which is substantially constant over the major portion of the charging period. A major disadvantage of presently known battery chargers resides in the fact that since the charging current is generally determined by the battery load, in the case of a substantially discharged battery, the battery internal resistance is very low thus producing an excessive charging rate and consequently causing damage to and reducing the life of the battery. Presently known battery chargers generally do not maintain close charging current control over the major portion of the charging period but merely reduce the charging current to zero as the battery terminal voltage approaches the desired terminal value and accordingly current limiting therein is determined merely by the charger voltage and its internal impedance.

When the battery voltage approaches its normal value it is also desired to maintain the charging output voltage substantially constant with variations in load conditions and A.C. source voltage. Presently known battery chargers, however, are inoperative to provide both the required charging current and charging voltage controlled regulation thus resulting in imperfect charging of the battery.

In accordance with the principles and operation of the present invention there is provided a novel battery charger which is operative to regulate the charging current at a preselected level until the battery terminal voltage approaches its normal value and thereafter maintain the charger output voltage substantially constant at a preselected level while suitably reducing the charging current.

It is therefore an object of the present invention to provide a battery charger wherein both charging current and charging voltage are automatically and concurrently controlled over the complete battery charging period.

Presently used battery chargers typically employ magnetic amplifiers to control the battery charging rate, such magnetic amplifiers being operable for only one A.C. source frequency unless the magnetic amplifier power windings are substantially modified by providing frequency selector taps on the magnetic amplifier power windings. Additionally, inductive isolation components such as transformers are generally required, thus adding substantially to the bulk and weight of the battery charger apparatus.

The present invention completely eliminates the need for magnetic amplifiers to achieve charging voltage or current control and instead provides a novel circuit configuration which uses solid state components exclusively, such as gate controlled rectifiers and transistors, to achieve the regulation function of the present invention. As a result thereof, the time lag in response inherent in magnetic amplifier type of battery chargers is avoided and, accordingly, in the present invention, the response of the control circuitry to chargers in operating conditions is virtually instantaneous.

Moreover, there is enabled in the present invention, substantial reductions in bulk and weight and a significant improvement in system reliability over presently used battery chargers which employ weighty components such as magnetic amplifiers for control purposes.

Additionally, the present invention provides for isolation without resorting to inductive isolating components, such as transformers, used heretofore, thus achieving a further reduction in bulk and weight.

Accordingly, it is a further object of the present invention to provide a novel lightweight and compact battery charger which is operative substantially independently of A.C. source frequency to automatically control the battery charging current and charging voltage.

Other features, objects and advantages of the invention will become apparent from the following description of a typical embodiment of the invention in which the drawing is a schematic circuit diagram of said embodiment.

Referring to the drawing there is shown a full wave rectifier bridge circuit generally shown at 5, comprising a pair of gate controlled rectifiers 10 and 12 having their cathodes 14 and 16 respectively interconnected at a junction point A, and a pair of diodes 18 and 20 having their anodes 22 and 24 respectively interconnected at a junction point B. Cathodes 26 and 28 are connected to anodes 30 and 32 respectively to thereby establish bridge circuit 5, input terminals 31 and 33 respectively, which may be suitably connected thereat to A.C. source 35, the output terminals of bridge circuit 5 being at junctions A and B. A pair of diodes 34 and 36 are serially interconnected across input terminals 31 and 33 with their respective cathodes 38 and 40 connected at a junction point C and their respective anodes 42 and 44 connected to input terminals 31 and 33 respectively. From this circuit configuration it is seen that when controlled rectifiers 10 and 12 are non-conductive, junction point C will be positive with respect to point A and the difference in potential between points C and A will vary in accordance with the level of conduction of controlled rectifiers 10 and 12.

A controlled oscillator 15, shown generally at unijunction transistor 46, is operative to provide a series of gating pulses to alternately gate electrodes 48 and 50, to thereby render, in response thereto, controlled rectifiers 10 and 12 alternately conductive at a particular point in the half cycle of A.C. source 35. The gating pulse output of oscillator 15 is taken across load resistor 60 which connects base electrode 58 to ground and thence through lead 52 and resistors 54 and 56 to gate electrodes 48 and 50 respectively. The frequency of the gating pulses provided by unijunction transistor 46 is controlled by the conduction level of control transistor 66 which controls the charging time constant of the series combination of the emitter 62 to collector 64 path of control transistor 66 and charging capacitor 68. The output of transistor 66 is applied from collector 64 to emitter 70 of unijunction transistor 46, and the level of conduction of transistor 66, which determines when emitter 70 will reach the firing potential of unijunction transistor 46, thus controls the frequency of the gating pulse output of oscillator 15.

The point during each half cycle of A.C. source 35 at which a gating pulse from oscillator 15 is applied to controlled rectifiers 10 and 12 determines the average power output of rectifier bridge circuit 5 and is dependent upon the load battery requirements. Thus, as the charging current requirements increase, controlled rectifiers 10 and 12 would ordinarily conduct over a greater portion of each half cycle which would result in an increase in energy dissipation in unijunction transistor 46. However, since the difference in potential between points C and A will decrease with an increase in the period of conduction of controlled rectifiers 10 and 12, the voltage applied to unijunction transistor 46 is accordingly decreased, thereby providing a self protection feature for unijunction transistor 46. Heretofore protection for unijunction transistors has been effected, with imperfect results, by the use of a Zener diode as a voltage limiting device. This novel self limiting feature in the present circuit obviates the need for extra components and protects the unijunction transistor at critical operating conditions i.e., for example, when the controlled rectifiers are conducting over a large portion of the cycle.

As pointed out above, the level of conduction of transistor 66 will determine the gating pulse frequency output of unijunction transistor 46. The conduction level of transistor 66 is determined by the level of the base current in base 72, which in turn is a function of two inputs thereto; a D.C. current control signal provided generally by transistors 74 and 76 and a D.C. voltage control signal provided generally by transistor 78. Base 63 of transistor 46 is connected through resistor 61 to emitter 62 which is connected to the junction of resistors 65 and 67, the other ends of resistors 65 and 67 being connected to junction point C and capacitor 68 respectively.

The charging current control function will now be described with the charging voltage control function to be described immediately thereafter. A current sampling resistor 80 is connected in output line 69 leading to terminal D, the voltage produced thereacross being proportional to the charging current. A portion of the output voltage appearing across output terminals D and E is sampled by a voltage divider comprising resistor 82 and either variable resistor 84 or 86, depending on the position of switch 88 which functions as a charging current level selector switch. As the load current through resistor 80 increases, the voltage thereacross will increase and to the extent that the voltage across resistor 80 exceeds the voltage across resistor 84 or 86, transistor 76 will become forward biased and accordingly conductive. In actual operation, resistor 84 or 86 is first adjusted so that the voltage thereacross equals the voltage across resistor 80 representing a particular charging current level. To the extent that the actual charging current exceeds the particular current level, transistor 76 is rendered conductive to, in turn, increase the conduction level of transistor 74 which is connected through its base 90 to collector 92 of transistor 76 by current limiting resistor 94. Collector 96 of transistor 74 and emitter 77 thereof are connected to base 72 and junction point C respectively. Accordingly, when transistor 74 is fully conductive, base 72 is effectively clamped to the reduced potential at junction point C to thereby reduce the conduction level of transistor 66 and maintain the output charging current at a level corresponding to the preselected value of variable resistor 84 or 86. Variable resistor 75 is connected across the base 90 to emitter 77 path of transistior 74 to provide stability and to function as variable gain adjustment for the input to transistor 74. Typically, resistor 75 would be adjusted to maintain stability of operation when the battery being charged was in a state of complete discharge. Capacitor 79 is also connected across base 90 and emitter 77 to filter noise at the input to transistor 74.

A shunt resistor 81, shown connected in lead 69 between resistor 80 and output terminal D, may be used with ammeter 83 connected thereacross to read the battery charging current.

When switch 88 is being switched between resistor 84 and 86 there will be a short time interval when neither resistors 84 or 86 are in circuit with transistor 76 thus producing the possibility of overcurrent in transistor 76. To protect against this possibility current limiting resistor 97 is connected between the junction of resistors 84 and 86 and base 98 of transistor 76. Capacitor 99 is connected across the base 98 to emitter 101 terminals of transistor 76 to eliminate noise at the input to transistor 76.

The charging voltage control circuitry includes a reference bridge 100 shown generally at resistor 78. A range selector switching arrangement is shown generally at switch 102 and is operative in conjunction with bridge 100 to select particular charging voltage levels. The range selection is accomplished by means of a network consisting of resistor arms in parallel arrangement, each resistor arm representing a preselected voltage range. One arm comprises variable resistor 104, the other two arms comprising resistor 106 with variable resistor 108 and resistor 110 with variable resistor 112, respectively. The four arms of reference bridge 100 comprise resistor 114, resistor 116, resistor 118, and Zener diode 120 which serves as voltage reference, respectively. Transistor 78 is connected across the diagonal of the bridge thus formed with its emitter 122 connected to the junction of resistor 114 and 116 and its base 124 connected to the junction point of Zener cathode 126 and resistor 118. Anode of Zener diode 120 and resistor 114 are interconnected at the common junction of the range selector arms at junction point F. Thus the voltage appearing across the base 124 to emitter 122 terminals of transistor 78 will represent the inbalance in bridge 100 and accordingly transistor 78 will act as a detector so that the conductivity level of transistor 78 will be a measure of the output voltage appearing at output terminals D and E. The switch position of switch 102 will determine the reference resistance ratio in bridge 100 so that the conduction level of detector transistor 78 will correspond to the charging voltage selected by voltage range switch 102.

The unique arrangement of the range selector resistor network shown generally at switch 102 in conjunction with reference bridge 100 enables the selection of a particular charging level merely by selecting the switch position of switch 102. Accordingly, it is not necessary to provide a separate voltage reference bridge or to make any other circuit modifications or calibrations when changing from one charging voltage level to another.

The output of transistor 78 appearing at collector 128 is connected to the input of transistor 66 at its base 72 through current limiting resistor 130. Thus, as the voltage at output terminals D and E decreases the voltage at emitter 122 will decrease. Since base 124 is maintained at a constant potential, as determined by Zener reference 126, the emitter 122 to base 124 potential goes negative with a drop in output voltage, thereby causing transistor 78 to conduct. Accordingly, a negative potential is applied to base 72 of transistor 66 thus increasing its conduction level to cause capacitor 68 to charge at a faster rate and hence cause unijunction transistor 46 to fire at a point earlier in the cycle. This action results in controlled rectifiers 10 and 12 conducting over a greater portion of the half cycle and thus a decrease in output voltage is compensated by an increase in charging current.

An important feature of the present invention resides in the fact that the requirement for transformers or other inductive isolating components, with the attendant disadvantages, to achieve isolation is obviated. Such isolation as may be required in the present invention is achieved, for example, by the use of diodes such as diodes 34 and 36, so that the junction point thereof is maintained at a fixed polarity. Accordingly, the present invention enables the intermixing of the voltage and current regulation functions without requiring isolation measures hitherto necessary in prior art systems, while maintaining a high efficiency of operation.

While the above described circuit constitutes a particular embodiment of the invention, it will be understood that it is not wished to be limited thereto since modifications can be made both in the circuit arrangement and in the instrumentalities employed and it is contemplated in the appended claims to cover any such modifications as fall within the true spirit and scope of the invention.

What is claimed and desired to be secured by U.S. Letters Patent is:

1. A battery charging circuit comprising in combination, a pair of input terminals adapted to be connected to an A.C. power source and a pair of output terminals adapted to be connected to a battery; a pair of gate-controlled rectifiers; a first pair of diodes in first full-wave bridge-rectifier configuration with said gate control rectifiers, said first bridge-rectifier being connected at its input to said charging circuit input terminals and connected at its output to said charging circuit output terminals; means for sampling the charging current output of said charging circuit; means for deriving a differential current signal proportional to the difference between said sampled charging current and a preselected current level; means for sampling the output voltage appearing at said charging circuit output terminals; means for providing a D.C. reference potential; means for deriving a differential voltage signal proportional to the difference between said sampled output voltage and said reference potential; means for deriving a control signal said control signal being determined by said current differential signal and said voltage differential signal; oscillator means in circuit with said control signal means and operative in response thereto for providing a series of gating pulses at a selectively variable point in the half cycle of A.C. source voltage determined by said control signal; and means for applying said gating pulses to said rectifier means to thereby render said rectifier means conductive at said selectively variable point to thereby control said charging circuit output.

2. A battery charging circuit as defined in claim 1 wherein said voltage sampling means includes electrical bridge means and voltage range selection means, said voltage range selection means being operative to render said electrical bridge means operative for various preselected charging voltage levels.

3. A battery charging circuit as defined in claim 2 wherein said voltage range selection means includes a plurality of resistor arms in parallel arrangement and switching means operative to selectively interconnect said resistor arms to one of said charging circuit output terminals and one arm of said electrical bridge means.

4. A battery charging circuit as defined in claim 1 wherein said current sampling means includes second electrical bridge means and current range selection means said current range selection means being operative to render said second electrical bridge means operative for various preselected charging current levels.

5. A battery charging circuit as defined in claim 4 wherein said current range selection means comprise a second plurality of resistors in parallel arrangement and second switching means operative to selectively connect said last mentioned resistors to one arm of said second electrical bridge means.

6. A battery charging circuit as defined in claim 1 wherein said oscillator means comprises a unijunction transistor having its emitter connected to the output of said control signal means, a pair of resistors interconnecting one of said unijunction transistor base electrodes to said gate electrodes respectively to thereby render said gate controlled rectifiers alternately conductive at a point in said half cycle of A.C. source determined by the magnitude of said control signal.

7. A battery charging circuit as defined in claim 6 wherein a second pair of diodes are provided in a second full-wave bridge-rectifier configuration with said first pair of diodes, said second bridge-rectifier being connected at its input to said charging circuit input terminals and connected at its output to said oscillator means whereby the oscillator means is synchronized with the input signal to said first bridge-rectifier.

References Cited

UNITED STATES PATENTS

| | | | |
|---|---|---|---|
| 3,106,665 | 10/1963 | Byles | 322—73 |
| 3,160,805 | 12/1964 | Lawson | 320—39 |
| 3,277,320 | 10/1966 | Connor | 307—141 |
| 3,296,516 | 1/1967 | Paine et al. | 320—39 X |
| 3,300,704 | 1/1967 | McMillen | 320—40 X |
| 3,310,729 | 3/1967 | Burgess et al. | 321—18 |

JOHN F. COUCH, *Primary Examiner.*

S. WEINBERG, *Assistant Examiner.*